United States Patent
Shimomura

(10) Patent No.: US 8,884,739 B2
(45) Date of Patent: Nov. 11, 2014

(54) VEHICLE SECURITY APPARATUS AND SYSTEM WHICH PREVENTS UNAUTHORIZED USE OF A VEHICLE BY IMMOBILIZATION

(75) Inventor: Toshio Shimomura, Chiryu (JP)

(73) Assignee: Denso Corporation, Kariya (JP)

( * ) Notice: Subject to any disclaimer, the term of this patent is extended or adjusted under 35 U.S.C. 154(b) by 1253 days.

(21) Appl. No.: 11/783,101

(22) Filed: Apr. 5, 2007

(65) Prior Publication Data

US 2007/0247281 A1  Oct. 25, 2007

(30) Foreign Application Priority Data

Apr. 5, 2006 (JP) .................................. 2006-104614

(51) Int. Cl.
*G08C 19/00*  (2006.01)
*B60R 25/20*  (2013.01)
*B60R 25/40*  (2013.01)

(52) U.S. Cl.
CPC ........... *B60R 25/2018* (2013.01); *B60R 25/403* (2013.01)
USPC ...................................................... 340/5.62

(58) Field of Classification Search
USPC ............ 340/426.11, 5.62, 5.72, 3.1; 307/10.1
See application file for complete search history.

(56) References Cited

U.S. PATENT DOCUMENTS

| | | | |
|---|---|---|---|
| 5,801,616 A * | 9/1998 | Ghazarian et al. ....... | 340/426.36 |
| 6,191,703 B1 * | 2/2001 | Wallace .................... | 340/825.69 |
| 6,249,215 B1 | 6/2001 | Dilz et al. | |
| 6,400,255 B1 | 6/2002 | Ohnishi et al. | |
| 6,552,648 B1 | 4/2003 | Rick et al. | |
| 7,173,517 B2 | 2/2007 | Kondo et al. | |
| 7,215,237 B1 | 5/2007 | Messerschmid et al. | |
| 7,224,261 B2 | 5/2007 | Shimomura | |
| 2002/0059532 A1 * | 5/2002 | Ata et al. ....................... | 713/202 |
| 2003/0090154 A1 * | 5/2003 | Takezaki et al. ............. | 307/10.2 |
| 2003/0212480 A1 * | 11/2003 | Lutter et al. .................... | 701/33 |
| 2004/0085195 A1 * | 5/2004 | McKibbon ............... | 340/426.36 |
| 2004/0204796 A1 * | 10/2004 | Harvey et al. ..................... | 701/1 |

(Continued)

FOREIGN PATENT DOCUMENTS

| | | |
|---|---|---|
| DE | 195 12 074 | 10/1996 |
| DE | 196 03 747 | 1/1997 |

(Continued)

OTHER PUBLICATIONS

German Office Action dated Oct. 20, 2009, issued in corresponding German Application No. 10 2007 013 999.5-51, with English translation.

(Continued)

*Primary Examiner* — Vernal Brown
(74) *Attorney, Agent, or Firm* — Nixon & Vanderhye PC

(57) ABSTRACT

A vehicle security apparatus includes an immobilizer ECU, a remote security ECU, a display, an operation unit, and a power supply control unit. The immobilizer ECU controls a drive prohibition and drive permission for an engine based on an identification signal transmitted from a key and/or a remote setting signal and a remote unsetting signal output from the remote security ECU. When a remote setting signal has been transmitted to set an immobilizer, the power supply control unit causes a power supply transition to an accessory-on state or an ignition-on state when an authorized identification signal from the key is transmitted. Thus, the remote immobilizer is enabled to be unset by the display and the operation unit.

19 Claims, 2 Drawing Sheets

(56) References Cited

U.S. PATENT DOCUMENTS

| | | |
|---|---|---|
| 2005/0122208 A1 | 6/2005 | Kondo et al. |
| 2005/0179320 A1 | 8/2005 | Shimomura |
| 2005/0179519 A1 | 8/2005 | Kawamura et al. |
| 2006/0049962 A1* | 3/2006 | Okada .......................... 340/901 |

FOREIGN PATENT DOCUMENTS

| | | |
|---|---|---|
| DE | 199 36 116 | 2/2001 |
| FR | 2 771 982 | 6/1999 |
| JP | A-2001-200665 | 1/2000 |
| JP | 2000-352245 | 12/2000 |
| JP | 2002-339612 | 11/2002 |
| JP | 2003-146185 | 5/2003 |
| JP | 2004-162477 | 6/2004 |
| JP | 2004-254134 | 9/2004 |
| JP | 2004-306821 | 11/2004 |
| JP | 2005-097835 | 4/2005 |
| JP | 2005-231592 | 9/2005 |
| JP | 2005-248902 | 9/2005 |
| JP | 2005-290739 | 10/2005 |
| JP | 2006-085470 | 3/2006 |

OTHER PUBLICATIONS

German Office Action dated Dec. 2, 2008 issued in corresponding DE Application No. 10 2007 013 999.5-51, with English translation.
Search Report issued from UK Intellectual Property Office dated Jan. 30, 2008 in Patent Application No. GB0706764.8.
Chinese Office Action dated Jan. 16, 2009 issued in corresponding Chinese Application No. 200710087389.8, with English translation.
British Search Report mailed Jul. 23, 2007 in Application No. GB0706764.8.
Office Action dated Jun. 30, 2010 issued in corresponding GB Application No. GB0706764.8 (2 pages).
Office Action (2 pgs.) dated Jan. 27, 2011 issued in corresponding Japanese Application No. 2006-104614 with an at least partial English-language translation thereof (1 pg.).

* cited by examiner

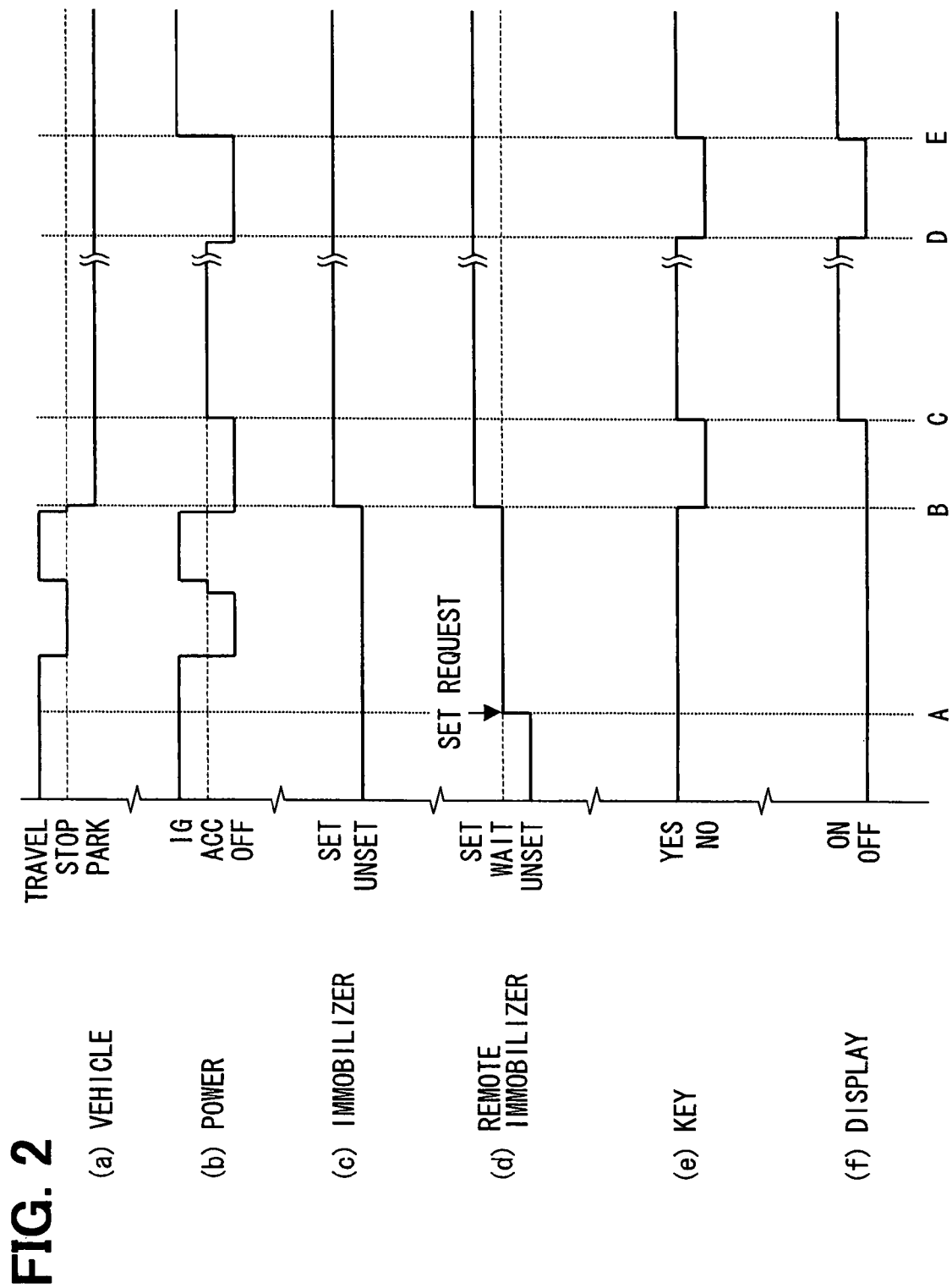

VEHICLE SECURITY APPARATUS AND SYSTEM WHICH PREVENTS UNAUTHORIZED USE OF A VEHICLE BY IMMOBILIZATION

CROSS REFERENCE TO RELATED APPLICATION

This application is based on and incorporates herein by reference Japanese Patent Application No. 2006-104614 filed on Apr. 5, 2006.

FIELD OF THE INVENTION

The present invention relates to a vehicle security apparatus and a vehicle security system.

BACKGROUND OF THE INVENTION

Vehicle security systems are proposed to prevent unauthorized use of a stolen vehicle by immobilizing the stolen vehicle when the vehicle is stolen with its authorized (normal) key.

In the case of robbery of a vehicle having such a vehicle security system along with its authorized key, when the owner of the vehicle reports the robbery to a base station, the base station transmits a signal representing a drive prohibition request for the engine of the vehicle to the vehicle using wireless communication. Upon receipt of the signal representing a drive prohibition request, the engine is prohibited from being started (for example, JP-A-2003-146185).

In this vehicle security system, for releasing prohibition control based on a signal representing a drive prohibition request transmitted from a base station, a releasing unit may be provided in the vehicle to release the prohibition when the releasing unit is operated. In this case, power must be supplied to the releasing unit to enable the same when a user wishes to release the prohibition. However, when power is normally supplied to the releasing unit, power consumption increases.

SUMMARY OF THE INVENTION

It is an object of the invention to provide a vehicle security apparatus and a vehicle security system, which operates with low power consumption.

According to one aspect, a vehicle security system has a vehicle security apparatus that is capable of communicating with an electronic key transmitting a unique identification signal and with a communication apparatus in a remote location transmitting drive request signals representing a drive prohibition request and a drive permission request for a vehicle driving device of a vehicle. The vehicle security apparatus comprises a key communication unit, a remote communication unit, a control unit and a releasing unit.

The key communication unit communicates with the electronic key. The remote communication unit communicates with the communication apparatus in the remote location. The control unit controls the vehicle driving device based on at least one of the identification signal transmitted to the key communication unit and the drive request signals transmitted to the remote communication unit. The releasing unit releases control over the vehicle driving device based on the drive request signal representing the drive prohibition request according to an instruction from a user. The control unit prohibits driving of the vehicle driving device upon receipt of the drive request signal representing the drive prohibition request at the remote communication unit and allows a transition of power from a power supply mounted on the vehicle such that the releasing unit can accept an instruction from the user only when the identification signal transmitted to the key communication unit is an authorized identification signal.

Alternatively, according to another aspect, the vehicle security apparatus further comprises a door lock switch detection unit, which is normally supplied with power from a power supply mounted on the vehicle and which detects an operation on a door lock switch of the vehicle. The control unit prohibits driving of the vehicle driving device upon receipt of the drive request signal representing the drive prohibition request by the remote communication unit and allows a transition of power from the power supply such that the releasing unit can accept an instruction from the user only when the door lock switch detection units detects an operation on the door lock switch of the vehicle.

BRIEF DESCRIPTION OF THE DRAWINGS

The above and other objects, features and advantages of the present invention will become more apparent from the following detailed description made with reference to the accompanying drawings. In the drawings:

FIG. 2 is a time chart showing operations of a vehicle security apparatus according to the embodiment of the invention.

DETAILED DESCRIPTION OF THE PREFERRED EMBODIMENT

Figure 1:
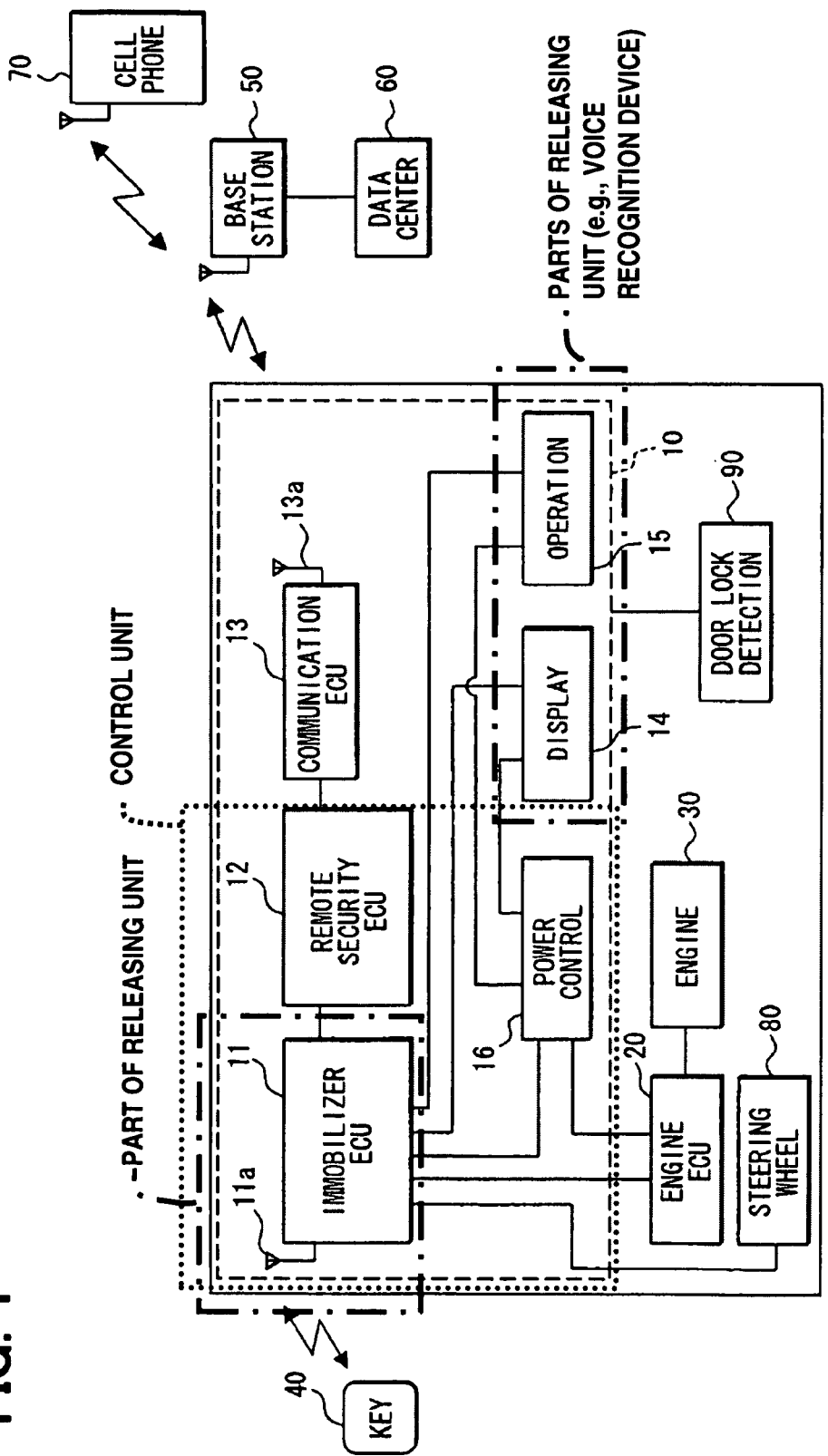
FIG. 1 is a block diagram showing a vehicle security system according to an embodiment of the invention.

Referring to FIG. 1, a vehicle security system includes a vehicle security apparatus 10, an engine electronic control unit (ECU) 20 for an engine 30, a vehicle electronic key 40, a base station 50, a data center 60 and a cellular phone 70.

The vehicle security apparatus 10 is mounted in a vehicle. It includes an immobilizer ECU 11 with an antenna 11a, a remote security ECU 12, a communication ECU 13 with an antenna 13a, a display 14, an operation unit 15, and a power supply control unit 16.

The immobilizer ECU 11 is a part of a control unit and a releasing unit, and it is primarily comprised of a microcomputer. The ECU 11 includes a memory such as a ROM, RAM or EEPROM, an interface circuit or a bus line for data transfer, and the antenna 11a, which allows communication with the key 40. The immobilizer ECU 11 detects a power supply state (ignition-on state, accessory-on state, or an OFF state of a vehicle ignition switch) in the power supply control unit 16.

The immobilizer ECU 11 outputs drive signals representing drive prohibition and drive permission for the engine 30 to the engine ECU 20 based on a remote set signal and a remote unset signal output from the remote security ECU 12. The operation of outputting the drive prohibition and drive permission to the engine ECU 20 are referred to as setting and unsetting of an immobilizer function or setting and unsetting of an immobilizer. The operations of outputting the drive signals representing a drive prohibition and drive permission to the engine ECU 20 based on a remote set signal and a remote unset signal output from the remote security ECU 12 are hereinafter referred to as setting and unsetting of a remote immobilizer function or setting and unsetting of a remote immobilizer.

That is, the immobilizer ECU 11 sets the immobilizer by outputting a drive signal representing a drive prohibition to the engine ECU 20 to prohibit the engine 30 from being started. The immobilizer ECU 11 unsets the immobilizer by outputting a drive signal representing drive permission to the engine ECU 20 to allow the engine 30 to be started.

When the remote immobilizer is set, the immobilizer ECU 11 outputs the drive signal representing a drive prohibition to the engine ECU 20 to keep the engine 30 prohibited from being started even if an identification signal is transmitted from the authorized key 40. When the remote immobilizer is unset (when the setting of the remote immobilizer is released), the immobilizer ECU 11 outputs the drive signal representing drive permission to the engine ECU 20 to allow the engine 30 to be started if the identification signal is transmitted from the authorized key 40.

Further, the immobilizer ECU 11 has a state of waiting for the remote immobilizer function to be set (standby state) that is a state, in which the ECU 11 has received only a remote set signal output from the remote security ECU 12. The state of waiting for the remote immobilizer function is referred to as a remote immobilizer standby state.

The immobilizer ECU 11 controls the transition of power supply in the power supply control unit 16 based on the identification signal transmitted from the key 40 and the remote set signal and remote unset signal output from the remote security ECU 12, i.e., based on the set and unset states of the immobilizer, the set and unset states of the remote immobilizer, and the identification signal transmitted from the key 40.

The vehicle key 40 may be a portable card key. The key 40 includes a communication device unit (not shown) having a unique identification signal (ID code), and the communication device unit transmits a response signal including an identification signal in response to a call signal from the antenna 11a. The antenna 11a is provided in the vicinity of a vehicle key slot (not shown) for starting the engine 30, and a switch (not shown) is provided in the key slot. The switch is turned on by inserting the key 40 in the key slot, and communication is established between the communication device unit of the key 40 and the antenna 11a.

The call signal from the antenna 11a may be transmitted at predetermined time intervals, or the call signal may alternatively be transmitted when a start/stop switch (not shown) is pressed.

The remote security ECU 12 is a part of the control unit, and it is primarily comprised of a microcomputer. The ECU 12 includes a memory such as a ROM, RAM or EEPROM and an interface circuit or bus line for data transfer. The remote security ECU 12 outputs the remote reset signal and remote unset signal output from the communication ECU 13, which will be described later, to the immobilizer ECU 11. The remote set signal is the drive request signal, which represents a drive prohibition request for a driving device of a vehicle. The remote unset signal is the drive request signal, which represents a drive permission request for a driving device of a vehicle.

The communication ECU 13 is a remote communication unit, and it is primarily comprised of a microcomputer. The ECU 13 includes a memory such as a ROM, RAM or EEPROM, an interface circuit or bus line for data transfer, and the antenna 13a which communicates with the base station 50 corresponding to the communication apparatus in a remote location, which is away from the security apparatus 10. The communication ECU 13 outputs a remote set signal and a remote unset signal transmitted from the base station 50 to the remote security ECU 12. It is sufficient that the communication ECU 13 has the capability of connection with a wireless telephone line or an internet line, and a mobile telephone may be used as the ECU 13.

The display 14 and the operation unit 15 are parts of a releasing unit, which are enabled for display of images and input operations when power is supplied from the power supply control unit 16. The display 14 includes a display screen like a liquid crystal display panel and a backlight. Based on an image signal output from the immobilizer ECU 11, the display 14 displays information (images) associated with unsetting of the remote immobilizer i.e., information (images) for releasing control based on the remote set signal. A display used in a navigation device may be used as the display 14.

The operation unit 15 is a part of a releasing unit. The operation unit 15 may be a transparent touch panel provided on the display surface of the display screen of the display 14, and the unit allows operations to be performed according to images displayed on the display screen of the display 14.

The information (images) associated with the unsetting of the remote immobilizer includes, for example, an input screen for a request for unsetting of the remote immobilizer and an input screen for an authentication number for unsetting of the remote immobilizer. The operations according to images displayed on the display screen of the display 14 include the operation of inputting the request for unsetting and the operation of inputting the authentication number.

In this embodiment, the releasing unit will be described using an example of the unit including the display 14 and the operation unit 15 (touch panel). For example, the releasing unit may have operation switches provided around the display 14 or provided on an overhead module, and the unit may alternatively be a joy stick provided on a center console. Further, the releasing unit may be a voice recognition device for determining whether the voice pronounced by a user satisfies a predetermined condition or not or a biological information determination device for determining whether biological information of a user (such as a fingerprint or voiceprint) satisfies a predetermined condition or not.

The power supply control unit 16 is a part of the control unit, and it is primarily comprised of a microcomputer. The control unit may include a memory such as a ROM, RAM or EEPROM or an interface circuit or bus line for data transfer. The power supply control unit 16 is connected to a battery (not shown), which is an on-vehicle power supply. The control unit switches power supply transitions based on instructions from the immobilizer ECU 11 to switch the state of power supply to each part of vehicle equipment (such as the display 14, the control unit 15, and the engine ECU 20).

The engine ECU 20 is primarily comprised of a microcomputer. It includes a memory such as a ROM, RAM or EEPROM or an interface circuit or bus line for data transfer. The engine ECU 20 allows a starter motor, a fuel injection device, and an ignition device to start operating based on a start signal from an ignition switch (not shown) only when the immobilizer ECU 11 has unset the immobilizer, that is, only when the drive signal representing drive permission for the engine 30 has been output. As a result, fuel is injected into the engine 30 with the starter motor rotated and ignited by the ignition plug. The engine 30 is thus started (driving is enabled).

The engine ECU 20 disables the starter motor, the fuel injection device, and the ignition device to start operating, when the immobilizer ECU 11 has set the immobilizer, that is, when the drive signal representing the drive prohibition for the engine 30 has been output. Thus, the engine ECU 20 does not allow the engine 30 to be started (driving is prohibited).

The base station 50 is the communication apparatus in a remote location. The base station can communicate with the communication ECU 13 and the cellular phone 70 on a wireless basis. The base station 50 is connected to the data center 60, which manages a multiplicity of pieces of vehicle information. In the vehicle security system, when a vehicle is stolen, the user (or owner) of the vehicle communicates with the base station 50 using the cellular phone 70 to report the robbery to the data center 60. Upon receipt of the report of robbery, the data center 60 outputs a remote set signal to the base station 50. Upon receipt of the remote set signal, the base station 50 transmits the remote set signal to the vehicle (communication ECU 13).

When the stolen vehicle is found, the user of the vehicle communicates with the base station 50 using the cellular phone 70 to report to the data center 60 that the stolen vehicle has been found. When it is reported that the stolen vehicle has been found, the data center 60 outputs a remote unset signal to the base station 50 to unset the remote immobilizer. Upon receipt of the remote unset signal, the base station 50 transmits the remote unset signal to the vehicle (communication ECU 13).

The vehicle security system can unset the remote immobilizer by transmitting a remote unset signal from the base station 50 or using the display 14 and the operation unit 15. Thus, the remote immobilizer can be unset even when the stolen vehicle is in a place out of reach of a radio wave (remote unset signal).

Operations of the present embodiment will now be described with reference to a time chart shown in FIG. 2.

It is assumed here that the vehicle is stolen along with the key 40 by an unauthorized person, who is not authorized to use the vehicle, and the key 40 is inserted in the key slot to drive the engine 30 and the vehicle. Then, the immobilizer ECU 11 checks whether the key 40 is the authorized one or not based on the identification signal transmitted from the key 40. When it is determined that the key 40 is the authorized one, the immobilizer is unset as shown in the period from a starting point (left end) up to a time point A in (c) of FIG. 2. Therefore, the power supply of the vehicle enters an ignition state (represented by IG in the figure) to allow the vehicle to be driven as shown in the periods from the starting points up to the points (a) and (b) in FIG. 2, when the unauthorized person turns the ignition switch on using the key 40, and the vehicle is freely used by the unauthorized person.

In order to avoid such a situation, when the vehicle is stolen, the authorized user of the vehicle communicates with the base station 50 using the cellular phone 70 to report the robbery to the data center 60. Upon receipt of the robbery report, the data center 60 outputs a remote set signal to the base station 50. Upon receipt of the remote set signal, the base station 50 transmits the remote set signal to the vehicle (communication ECU 13) as shown at the point A in (d) of FIG. 2 to request setting of the remote immobilizer.

The communication ECU 13 receives the remote set signal through the antenna 13*a*. The communication ECU 13 outputs the received remote set signal to the remote security ECU 12. The remote security ECU 12 outputs the received remote set signal to the immobilizer ECU 11.

When a remote set signal has been output by the remote security ECU 12, the immobilizer ECU 11 keeps the immobilizer unset for a period, during which the immobilizer is unset based on the identification signal from the key 40. Specifically, the immobilizer ECU 11 keeps the immobilizer unset as shown in the periods from the points A to the points B in (c) and (d) of FIG. 2 to put the remote immobilizer in the standby state, thereby prohibiting the engine ECU 20 from outputting a drive signal representing a drive prohibition for the engine 30.

Therefore, even when the vehicle stops or the power supply enters the accessory-on state or off state as shown between the points A and B in (a) and (b) of FIG. 2, the immobilizer ECU 11 keeps the immobilizer unset and outputs a drive signal representing drive permission to the engine ECU 20. The vehicle is therefore in a drivable state.

The vehicle is traveling or on a traveling lane in most cases when a drive signal representing drive permission for the engine 30 is output to the engine ECU 20 based on the identification signal from the key 40. Therefore, the immobilizer ECU 11 keeps the immobilizer unset and outputs a drive signal representing drive permission to the engine ECU 20, when a remote set signal is output during the period in which the immobilizer is unset based on an identification signal from the key 40. As a result, the engine 30 can be prevented from being prohibited from starting when the vehicle is on a traveling lane, thus preventing the vehicle from disturbing the flow of traffic. That is, the drive prohibition on the engine 30 can be prevented in case that the engine 30 of the stolen vehicle has stalled or has been stopped at a red traffic light, it is therefore possible to prevent the vehicle from disturbing the flow of traffic.

Since the immobilizer ECU 11 keeps the immobilizer unset and outputs a drive signal representing drive permission to the engine ECU 20 as thus described when the remote set signal is output during the period in which the immobilizer is unset based on the identification signal from the key 40, the engine 30 can be prevented from being prohibited from starting even in the case of a malfunction of the remote immobilizer such as erroneous transmission of a remote unset signal.

Preferably, when the immobilizer is kept unset and the remote immobilizer is kept in the standby state as shown in the periods from the points A to the points B in (c) and (d) of FIG. 2, the immobilizer ECU 11 cancels the standby state of the remote immobilizer when a remote unset signal is output from the remote security ECU 12.

Described next are situations, in which a drive prohibition is placed on the engine 30 by the immobilizer ECU 11, and in which the immobilizer function of the remote immobilizer function is set by the immobilizer ECU 11.

After the immobilizer ECU 11 has put the remote immobilizer in the standby state according to the remote set signal received from the base station 50 through the remote security ECU 12 as shown in the period from the point A to the point B in (d) of FIG. 2, the ECU 11 sets the immobilizer and the remote immobilizer when the vehicle enters a parking state in which the key 40 is removed from the key slot as shown between the points B and C in (e) of FIG. 2 and the power supply is in the off state as shown in (a) and (b) of FIG. 2. That is, when the immobilizer ECU 11 determines that there is no identification signal from the key 40, which occurs because the key 40 has been removed from the key slot, and determines that the authorized key 40 is not inserted in the key slot, the ECU 11 sets the immobilizer and the remote immobilizer. When the immobilizer is set, the immobilizer ECU 11 outputs a drive signal representing a drive prohibition to the engine ECU 20 to prohibit the engine 30 from being started.

During a period in which the immobilizer and the remote immobilizer are set (e.g., the periods starting at the points B in (c) and (d) of FIG. 2), the immobilizer ECU 11 does not unset the immobilizer and keeps the immobilizer set even if the authorized key 40 is inserted in the key slot. The purpose is to prevent unauthorized use of the vehicle from being continued by an unauthorized person.

When a remote set signal has been transmitted to set the immobilizer as indicated by the points C and E in (e) of FIG. 2, the immobilizer ECU 11 checks whether the key is the authorized key 40 or not from the identification signal transmitted by the key 40. When it is determined that the key is the authorized key 40 (key state: YES in (e) of FIG. 2), power supply control unit 16 causes a power supply transition to an accessory-on state or an ignition-on state with the immobilizer and the remote immobilizer kept set.

When such a power supply transition to the accessory-on state or the ignition-on state takes place as thus described, the display 14 and the operation unit 15 are enabled for display of images and for input operations. Specifically, when the power supply transition to the accessory-on state or the ignition-on state takes place, the remote immobilizer enters a state in which it can be unset by the display 14 and the control unit 15. Even when such a power supply transition to the accessory-on state or the ignition-on state takes place as thus described or even when the key is determined to be the authorized key 40, the immobilizer is kept set at least until the remote immobilizer is unset.

Further, the system may be arranged so that a power supply transition to the accessory-on state takes place if the key is determined to be the authorized key 40 and the start/stop switch (not shown) is pressed, or when a brake pedal (not shown) is stepped on and the key is determined to be the authorized key 40, and the start/stop switch (not shown) is pressed, a power supply transition to the ignition-on state takes place. Alternatively, a power supply transition to the accessory-on state may take place when the start/stop switch (not shown) is pressed once when the key is determined to be the authorized key 40, and a power supply transition to the ignition-on state may take place when the start/stop switch (not shown) is pressed again within a predetermined time after the first press.

Described further is a situation in which starting of the engine 30 is allowed by the immobilizer ECU 11, that is, the immobilizer ECU 11 unsets the immobilizer function and the remote immobilizer function.

First, unsetting of the functions using the base station 50 will be described. For example, when a stolen vehicle has been found and the authorized user of the vehicle can get in the vehicle, the authorized user of the vehicle communicates with the base station 50 using the cellular phone 70 to report to the data center 60 that the vehicle has been found. Upon receipt of the report that the vehicle has been found, the data center 60 outputs a remote unset signal to the base station 50. Upon receipt of the remote unset signal, the base station 50 transmits the remote unset signal to the vehicle (communication ECU 13) to make a remote immobilizer unset request.

The communication ECU 13 receives the remote unset signal through the antenna 13*a*. The communication ECU 13 outputs the received remote unset signal to the remote security ECU 12. The remote security ECU 12 outputs the received remote unset signal to the immobilizer ECU 11.

When the remote unset signal is output from the remote security ECU 12, the immobilizer ECU 11 unsets the remote immobilizer. During a period in which the immobilizer is set based on the identification signal from the key 40, the immobilizer ECU 11 preferably keeps the immobilizer set even when the remote unset signal is output from the remote security ECU 12 to unset the remote immobilizer. That is, the immobilizer ECU 11 keeps the immobilizer set even if the remote immobilizer is unset, and keeps outputting a drive signal representing a drive prohibition to the engine ECU 20. The vehicle is therefore disabled from traveling without the authorized key 40.

It is assumed that the immobilizer is unset concurrently with unsetting of the remote immobilizer. When the immobilizer is unset by the unsetting of the remote immobilizer, the immobilizer ECU 11 outputs a drive signal representing drive permission to the engine ECU 20, which is not desired. Therefore, the vehicle becomes drivable without the authorized key 40 in the slot when the immobilizer is unset by the unsetting of the remote immobilizer. Therefore, as described in the present embodiment, the immobilizer ECU 11 keeps outputting a drive signal representing a drive prohibition to the engine ECU 20 even when a remote unset signal is output from the remote security ECU 12 to unset the remote immobilizer during the period in which the immobilizer is set based on the identification signal from the key 40. Thus, unauthorized use of the vehicle can be prevented from being continued by an unauthorized person.

When the key 40 is inserted in the key slot with the remote immobilizer unset, the immobilizer ECU 11 checks whether the key is an authorized key 40 or not from the identification signal transmitted from the key 40, and unsets the immobilizer when the key is determined to be an authorized one.

Immobilizers may be unset by way of the display 14 and the control unit 15 in the following manner. When a remote set signal has been transmitted to the immobilizer ECU 11 to set the immobilizers (the immobilizer and the remote immobilizer have been set) as indicated by the points C and E in (e) of FIG. 2, a power supply transition to the accessory-on state or ignition-on state at the power supply control unit 16 enables operations of the display 14 and the operation unit 15 such as display of images and input operations.

The immobilizer ECU 11 displays images relating to unsetting of the remote immobilizer (e.g., a screen for inputting a request for unsetting of the remote immobilizer or a screen for inputting an authentication number for unsetting of the immobilizer) on the display screen of the display 14. When an operation associated with the images relating to unsetting of the remote immobilizer (e.g., an operation of inputting a request for unsetting or an operation of inputting an authentication number) is performed in this state, the immobilizer ECU 11 unsets the remote immobilizer.

During a period in which the immobilizer is set based on the identification signal from the key 40, the immobilizer ECU 11 keeps the immobilizer set even when the operation associated with images relating to unsetting of the remote immobilizer displayed on the display screen of the display 14 is performed at the operation unit 15. Even if the remote immobilizer is unset, the immobilizer ECU 11 keeps the immobilizer set to keep outputting a drive signal representing a drive prohibition to the engine ECU 20. The vehicle is therefore disabled from traveling without the authorized key 40.

As thus described, when a remote set signal has been transmitted to set the immobilizers (the immobilizer and the remote immobilizer have been set), the power supply control unit 16 causes a power supply transition to the accessory-on state or the ignition-on state, which allows a reduction in power consumption.

Although the embodiment has been described with reference to an example in which a remote set signal and a remote unset signal are transmitted from the base station 50, it is possible to transmit a remote set signal and a remote unset signal from any communication apparatuses in a remote location, which transmits drive request signals representing a drive prohibition request and a drive permission request for the vehicle engine 30.

The immobilizer ECU 11 may control the locking and unlocking of a steering wheel 80 based on the identification signal transmitted from the key 40. Specifically, the immobilizer ECU 11 locks the steering wheel 80 when the authorized identification signal is not transmitted from the key 40 and unlocks the steering wheel 80 when the authorized identification signal is transmitted from the key 40. When a remote set signal has been transmitted to set the immobilizers (the immobilizer and the remote immobilizers have been set), the unlocking of the steering wheel 80 maybe prohibited, although the power supply control unit 16 causes a power supply transition to the accessory-on state or the ignition-on state.

The present embodiment has been described with reference to an example in which the power supply control unit 16 causes a power supply transition to the accessory-on state or the ignition-on state in response to transmission of the authorized identification signal from the key 40 when a remote set signal has been transmitted to set the immobilizers (the immobilizer and the remote immobilizers have been set). Alternatively, the power supply transition may be caused based on an operation on a door lock switch. In general, power is normally supplied to a door lock switch detection unit 90 for detecting an operation on the door lock switch. Therefore, a reduction in power consumption can be also achieved by allowing the power supply transition to the accessory-on state or the ignition-on state at the power supply control unit 16 only when the door lock switch detection unit 90 detects an operation on the door lock switch of the vehicle after a remote set signal has been transmitted to set the immobilizers (the immobilizer and the remote immobilizer have been set).

The present embodiment has been described with reference to an example, in which the power supply control unit 16 causes a power supply transition to the accessory-on state or the ignition-on state in response to transmission of the correct identification signal from the key 40 when a remote set signal has been transmitted to set the immobilizers (the immobilizer and the remote immobilizers have been set). Alternatively, the power supply transition may be such that power is supplied only to the display 14 and the operation unit 15 without turning the accessory and ignition on. A further reduction in power consumption can thus be achieved by this power supply transition such that power is supplied only to the display 14 and the operation unit 15 without turning the accessory and ignition on.

Although the present embodiment has been described with reference to an example, in which the cellular phone 70 is used for communication with the base station 50, a stationary telephone set at home may alternatively be used.

In the resent embodiment, the vehicle security apparatus 10 includes the immobilizer ECU 11, the antenna 11*a*, the remote security ECU 12, the communication ECU 13, and the antenna 13*a*. It is however possible that the apparatus 10 may be a controller that includes a key communication unit for communication regarding the key 40, a remote communication unit for communication with the base station 50, and a control unit for controlling the engine 30 by prohibiting or permitting the starting of the same based on an identification signal transmitted to the key communication unit and a remote set signal and a remote unset signal transmitted to the remote communication unit.

What is claimed is:

1. A vehicle security apparatus having a configuration to communicate with an electronic key transmitting a unique identification signal and with a communication apparatus in a remote location, with respect to the vehicle security apparatus, transmitting drive request signals representing a drive prohibition request and a drive permission request for a vehicle driving device of a vehicle, which is operable electrically, the vehicle security apparatus comprising:

a key communication unit having a configuration to communicate with the electronic key;

a remote communication unit having a configuration to communicate with the communication apparatus in the remote location;

a control unit having a configuration to control the vehicle driving device based on at least one of the identification signal transmitted to the key communication unit and the drive request signals transmitted to the remote communication unit, the control unit prohibiting the vehicle driving device from being operated in response to the drive request signal representing the drive prohibition request even when the identification signal is an authorized identification signal; and a releasing unit having a configuration to release control over the vehicle driving device according to an instruction from a user, the control being performed based on the drive request signal representing the drive prohibition request, wherein the control unit has a configuration to allow a transition of power from a power supply mounted on the vehicle to only the releasing unit such that the releasing unit is made operable to accept an instruction from the user for releasing the drive prohibition performed based on the drive request signal, only when the identification signal transmitted to the key communication unit is the authorized identification signal under a condition that driving of the vehicle driving device is prohibited by the drive request signal representing the drive prohibition request at the remote communication unit, and wherein the control unit has a configuration to prohibit the drive permission for the vehicle driving device until the control over the vehicle driving device based on the drive request signal representing the drive prohibition request is released by the instruction from the user to the releasing unit, even when the power supply transition to the releasing unit is allowed.

2. The vehicle security apparatus according to claim 1, wherein the control unit also has a configuration to control locking and unlocking of a steering wheel of the vehicle based on the identification signal transmitted to the key communication unit and prohibit unlocking of the steering wheel until at least the control over the vehicle driving device based on the drive request signal representing the drive prohibition request is released, even when the power supply transition is allowed.

3. The vehicle security apparatus according to claim 1, wherein:

the releasing unit includes a display unit which has a configuration to display an image for releasing the control over the vehicle driving device based on the drive request signal representing the drive prohibition request, and an operation unit operable by the user and having a configuration to allow an operation associated with the image; and the releasing unit has a configuration to release the control over the vehicle driving device, when an operation based on the image displayed on the display unit is performed on the operation unit.

4. The vehicle security apparatus according to claim 1, wherein the releasing unit includes an operation unit, which is operable by the user and has a configuration to release the control over the vehicle driving device according to an operation by the user.

5. The vehicle security apparatus according to claim 1, wherein the releasing unit includes a voice recognition device having a configuration to check whether the voice of the user satisfies a predetermined condition, and has a configuration to release the control over the vehicle driving device when the voice recognition device determines that the voice satisfies the predetermined condition.

6. The vehicle security apparatus according to claim 1, wherein the releasing unit includes a biological information determination device having a configuration to check whether biological information on the user satisfies a predetermined condition, and has a configuration to release the control over the vehicle driving device when the biological information determination device determines that the biological information satisfies the predetermined condition.

7. The vehicle security apparatus according to claim 1, wherein:
   the control unit has a configuration to control the power from the power supply mounted on the vehicle for a transition to an off state, an accessory-on state or an ignition-on state; and
   the control unit has a configuration to make the power supply transition of the power supply to the accessory-on state or the ignition-on state, when the transition of the power from the power supply is allowed such that the releasing unit can accept an instruction from the user.

8. The vehicle security apparatus according to claim 1, wherein:
   the control unit has a configuration to control the transition of the power from the power supply; and
   the control unit has a configuration to supply power to the releasing unit without making the accessory-on state and the ignition-on state, when the transition of the power from the power supply is allowed such that the releasing unit can accept an instruction from the user.

9. A vehicle security system comprising:
   an electronic key which is portable and which has a configuration to transmit a unique identification signal;
   a communication apparatus having a configuration to remote-control a vehicle driving device of a vehicle by transmitting drive request signals representing a drive prohibition request and a drive permission request; and
   a vehicle security apparatus according to claim 1.

10. A vehicle security apparatus having a configuration to communicate with an electronic key transmitting a unique identification signal and with a communication apparatus in a remote location, with respect to the vehicle security apparatus, transmitting drive request signals representing a drive prohibition request and a drive permission request for a vehicle driving device of a vehicle, which is operable electrically the vehicle security apparatus comprising:
   a key communication unit having a configuration to communicate with the electronic key;
   a remote communication unit having a configuration to communicate with the communication apparatus in the remote location;
   a control unit having a configuration to control the vehicle driving device based on at least one of the identification signal transmitted to the key communication unit and the drive request signals transmitted to the remote communication unit, the control unit having a configuration to prohibit the vehicle driving device from being operated in response to the drive request signal representing the drive prohibition request even when the identification signal is an authorized identification signal;
   a releasing unit having a configuration to release control over the vehicle driving device according to an instruction from a user, the control being performed based on the drive request signal representing the drive prohibition request; and
   a door lock switch detection unit which is normally supplied with power from a power supply mounted on the vehicle and which has a configuration to detect an operation on a door lock switch of the vehicle,
   wherein the control unit having a configuration to allow a transition of power from the power supply to only the releasing unit such that the releasing unit is made operable to accept an instruction from the user for releasing the drive prohibition performed based on the drive request signal, only when the door lock switch detection units detects an operation on the door lock switch of the vehicle under a condition that driving of the vehicle driving device is prohibited by the drive request signal representing the drive prohibition request by the remote communication unit, and
   wherein the control unit has a configuration to prohibit the drive permission for the vehicle driving device until the control over the vehicle driving device based on the drive request signal representing the drive prohibition request is released by the instruction from the user to the releasing unit, even when the power supply transition to the releasing unit is allowed.

11. The vehicle security apparatus according to claim 10, wherein the control unit also has a configuration to control locking and unlocking of a steering wheel of the vehicle based on the identification signal transmitted to the key communication unit and prohibit unlocking of the steering wheel until at least the control over the vehicle driving device based on the drive request signal representing the drive prohibition request is released, even when the power supply transition is allowed.

12. The vehicle security apparatus according to claim 10, wherein:
   the releasing unit includes a display unit having a configuration to display an image for releasing the control over the vehicle driving device based on the drive request signal representing the drive prohibition request, and an operation unit operable by the user and having a configuration to allow an operation associated with the image; and
   the releasing unit has a configuration to release the control over the vehicle driving device, when an operation based on the image displayed on the display unit is performed on the operation unit.

13. The vehicle security apparatus according to claim 10, wherein the releasing unit includes an operation unit, which is operable by the user and has a configuration to release the control over the vehicle driving device according to an operation by the user.

14. The vehicle security apparatus according to claim 10, wherein the releasing unit includes a voice recognition device has a configuration to check whether the voice of the user satisfies a predetermined condition, and release the control over the vehicle driving device when the voice recognition device determines that the voice satisfies the predetermined condition.

15. The vehicle security apparatus according to claim 10, wherein the releasing unit includes a biological information determination device having a configuration to check whether biological information on the user satisfies a predetermined condition, and release the control over the vehicle driving device when the biological information determination device determines that the biological information satisfies the predetermined condition.

16. The vehicle security apparatus according to claim 10, wherein:

the control unit has a configuration to control the power from the power supply mounted on the vehicle for a transition to an off state, an accessory-on state or an ignition-on state; and the control unit has a configuration to make the power supply transition of the power supply to the accessory-on state or the ignition-on state, when the transition of the power from the power supply is allowed such that the releasing unit can accept an instruction from the user.

17. The vehicle security apparatus according to claim 10, wherein:

the control unit has a configuration to control the transition of the power from the power supply; and the control unit has a configuration to supply power to the releasing unit without making the accessory-on state and the ignition-on state, when the transition of the power from the power supply is allowed such that the releasing unit can accept an instruction from the user.

18. A vehicle security system comprising:

an electronic key which is portable and which has a configuration to transmit a unique identification signal;

a communication apparatus having a configuration to remote-control a vehicle driving device of a vehicle by transmitting drive request signals representing a drive prohibition request and a drive permission request; and a vehicle security apparatus according to claim 10.

19. A security control method for a vehicle having an engine, the method comprising:

receiving a drive prohibition request from an external location outside of the vehicle, the drive prohibition request indicating prohibition of operation of the engine;

maintaining the prohibition of operation of the engine electrically in response to the drive prohibition request;

communicating with an electronic key to receive an identification signal of the electronic key;

starting to supply electric power to only a releasing unit provided to be electrically operable to receive an input of a user of the vehicle, only when a received identification signal of the electronic key is determined to be an authorized identification signal under a condition that the prohibition of operation of the engine is maintained;

accepting the input of a user of the vehicle made on the releasing unit to release the engine from the prohibition of operation for electrically permitting operation of the engine to drive the vehicle, the releasing unit being disabled to accept the input of a user without electric power;

releasing the engine from the prohibition of operation only after the input of a user is accepted by the releasing unit; and electrically operating, the engine with supply of electric power.

* * * * *